Sept. 8, 1964  J. W. KEY  3,147,971
STRIPPER
Filed April 2, 1962  4 Sheets-Sheet 1
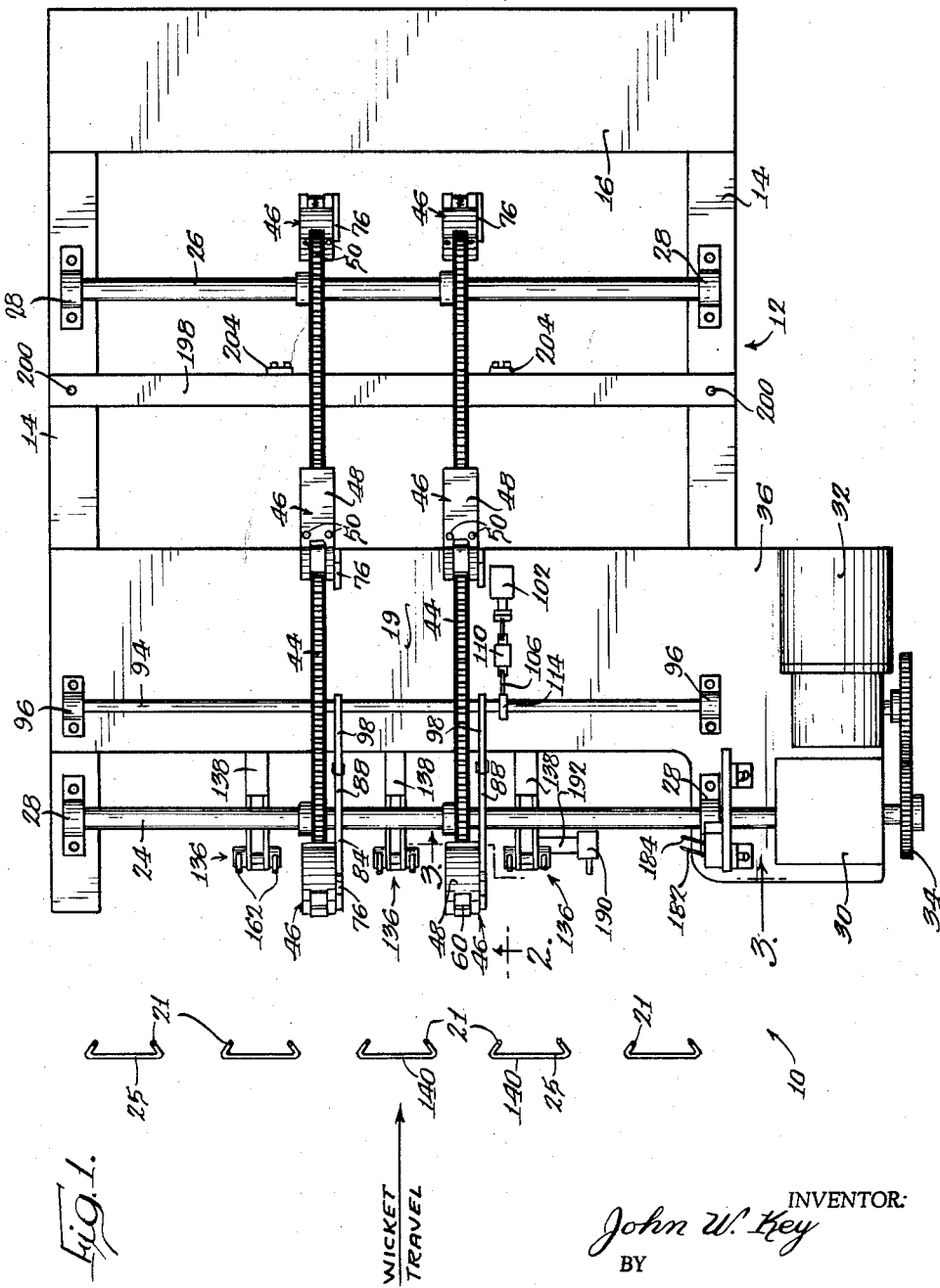

Sept. 8, 1964 J. W. KEY 3,147,971
STRIPPER
Filed April 2, 1962 4 Sheets-Sheet 2
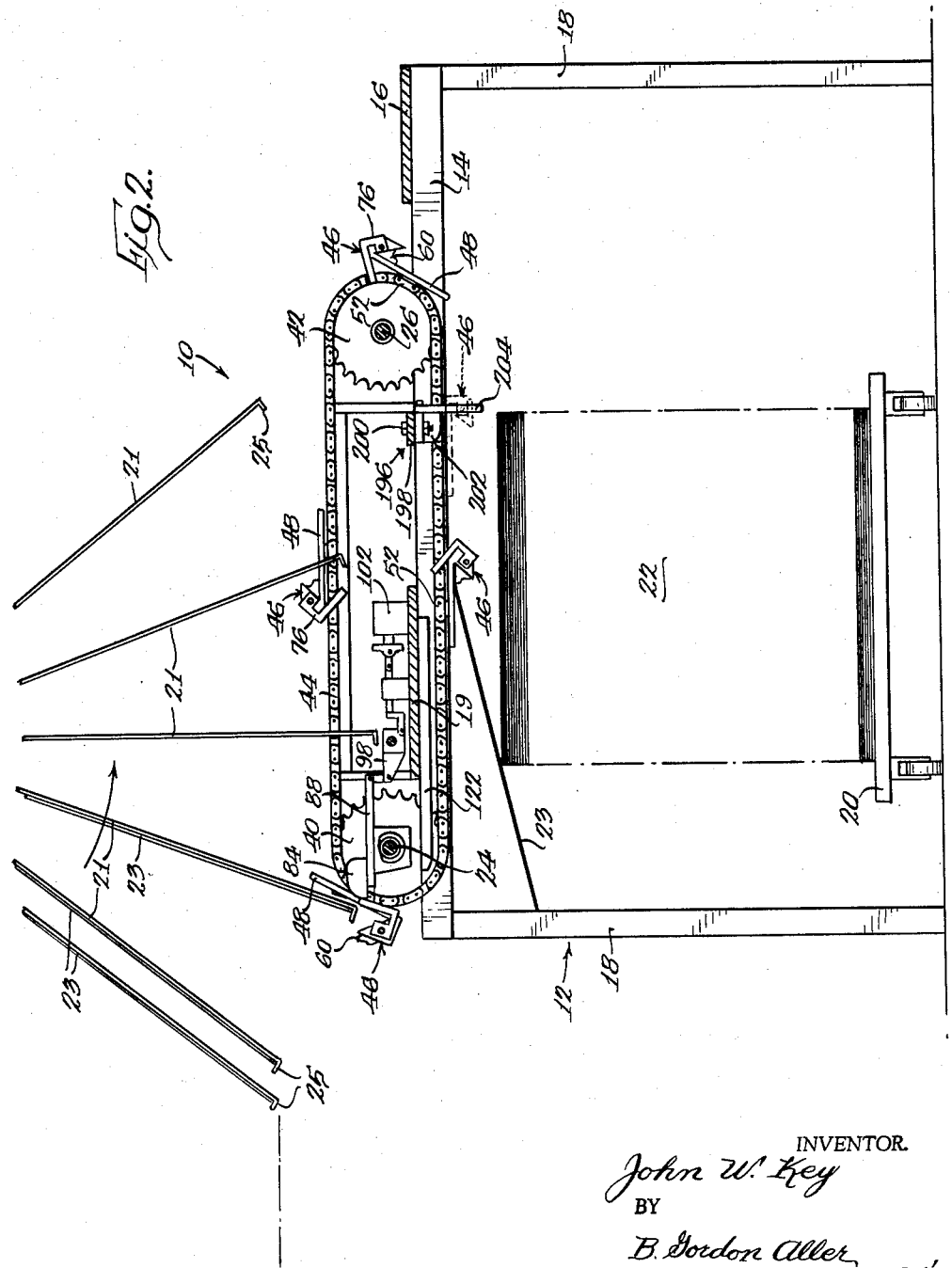
INVENTOR.
John W. Key
BY
B. Gordon Allen
Atty

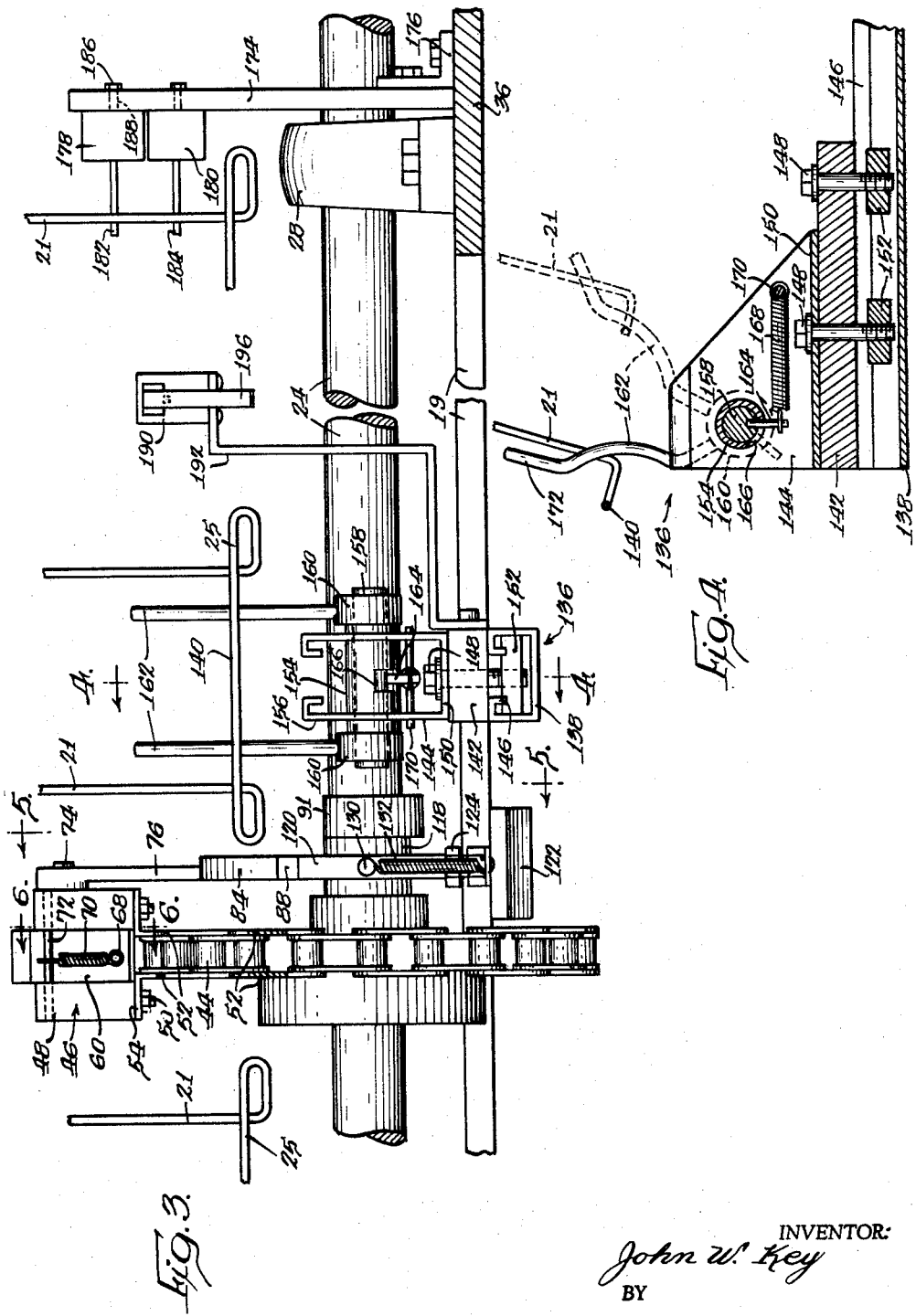

Sept. 8, 1964
J. W. KEY
3,147,971
STRIPPER
Filed April 2, 1962
4 Sheets-Sheet 4
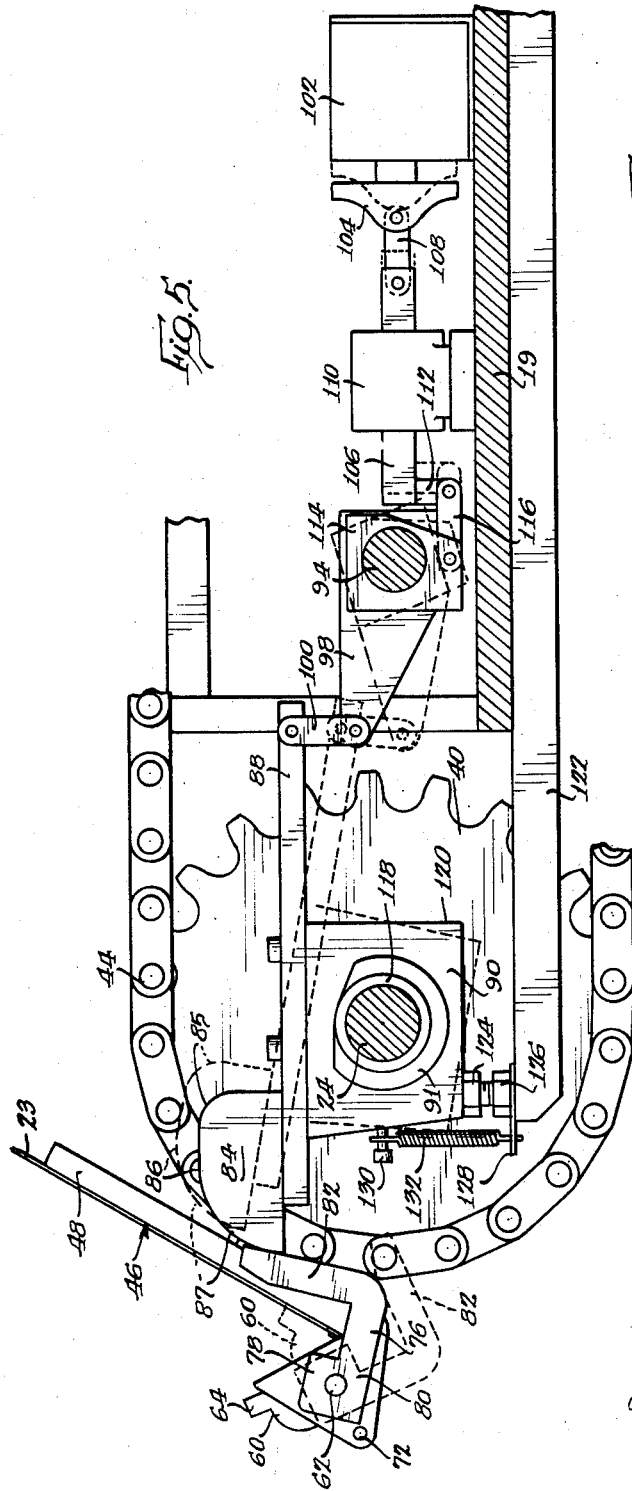
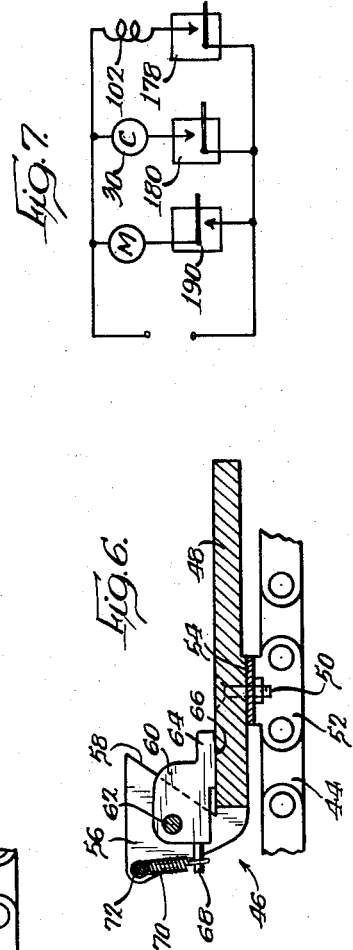
INVENTOR:
John W. Key
BY
B. Gordon Allen
Atty

United States Patent Office 3,147,971
Patented Sept. 8, 1964

3,147,971
STRIPPER
John W. Key, 606 Ironwood Drive,
Arlington Heights, Ill.
Filed Apr. 2, 1962, Ser. No. 184,150
8 Claims. (Cl. 271—68)

My invention relates to a stripper or stripper-stacker for removing printed sheets from a wicket conveyor.

Wicket conveyors are employed to receive sheets from a printing press and convey them through a drying and tempering zone. The wickets consist of long U-shaped wire frames bent over at the end into a hook. The wickets are mounted in transverse rows on an inner, horizontally oriented, endless belt and travel, during the top side portion of their movement, through a drying and rehumidifying zone and, during the underside portion, in the open air to permit an equalizing of the added moisture. The hook ends of the wickets all face backward relative to their direction of travel.

Strippers have been devised for unloading conveyors of this sort, but none that I know of provides for stacking the sheets face up following their passage through the conveyor. Thus, an operator is unable to check visually the quality of the printing in process, and the stack of dried sheets must be inverted for inspection and delivery to the purchaser.

A further difficulty with the existing strippers is that they stack the sheets so irregularly oriented and out of alignment as to forbid jogging. It also occurs frequently that a sheet will be improperly extracted and be caught by a following wicket, resulting in a jamming of the operation of the conveyor, interrupting the work flow and requiring time for clearance and for readjustment of the wickets. To avoid such occurrence, constant attendance of an operator is necessary to stop the conveyor upon the first appearance of a non-evtracted sheet.

My invention is directed to a stripping and stacking device for a wicket conveyor wherein the sheets are positively ejected from the wickets, are given an opportunity to settle into a precise orientation and are then carried quickly away from the wickets of the conveyor in a path which inverts the sheets and delivers them into a pile, face up, with sufficient accuracy to permit jogging.

More narrowly, the objects of my invention may be considered to include the provision of novel and effective yet simple mechanism for ejecting the sheets from the wickets, the provision of a momentarily stationary receiver to receive the sheets and permit them to settle into a predetermined orientation and avoid a diagonal extraction which might readily jam the conveyor and will certainly make a poor stack, and the provision of a delivery path for the sheets whereby they are inverted before stacking. Other advantages of my invention include a control system whereby wicket position governs the operation of the stripper, and the provision of jam-detecting mechanism which serves to stop all operations at the moment a non-extracted sheet is detected. All these objects and advantages are achieved by mechanism which is simple and will function with certainty.

Other objects and advantages of my invention will be apparent from the following description and drawings of which:

FIG. 1 is a top plan view of an embodiment of my stripper-stacker shown in association with a row of wickets of a wicket conveyor;

FIG. 2 is a section taken along the line 2—2 of FIG. 1 looking in the direction of the arrows illustrating a repsentative unit of my invention in side elevation;

FIG. 3 is an enlarged fragmentary front end elevation thereof taken substantially from the line 3—3 of FIG. 1 looking in the direction of the arrows;

FIG. 4 is a section taken substantially along the line 4—4 of FIG. 3 looking in the direction of the arrows;

FIG. 5 is an enlarged side elevation of a portion of the front end of my device taken substantially from the line 5—5 of FIG. 3 looking in the direction of the arrows;

FIG. 6 is a side elevation of one of the paper clamps of my invention taken substantially along the line 6—6 of FIG. 3; and FIG. 7 is an electrical circuit suitable for the illustrated embodiment.

Considering particularly FIGS. 1 and 2, the illustrated stripper 10 of my invention is shown mounted on a table-like frame 12 having side rails 14, an end rail 16, legs 18 and a partial transverse table top 19. The legs 18 are desirably long enough to receive a jogger (not shown) and a dolly 20 underneath the frame with sufficient room above for an adequate stack 22 of sheets.

The frame and stripper-stacker are shown in operative association with some wickets 21 of a wicket conveyor. Considering FIG. 2, the rows of wickets are returning, from left to right, at the end of the open air equalizing or stabilizing passage bearing sheets 23, printed side down, against the back side of the wickets and supported on the hooks 25 thereof. In their passage through or by the stripper-stacker, the wickets swing from their backwardly inclined, sheet-carrying orientation through the vertical and are carried upward to receive wet printed sheets from the press, face up.

The stripper-stacker of my invention consists basically of a front 24 and a rear 26 sprocket shaft mounted transversely to the frame in yellow blocks 28 secured to the side rails 14. Shaft 26 terminates at its pillow blocks 28. Shaft 24 extends beyond the pillow blocks 28 at one end to a one revolution clutch 30. This clutch is a commercially available item and has the characteristic that, with a continuous drive, it will make a single revolution when appropriately energized, and stop. The clutch is driven by a continuously rotating motor 32 through an intermediate gear train 34. The motor and clutch are mounted to an extension 36 of the table top 19 extending out beyond one side of the table 12.

In FIG. 1, I show one transverse row of wickets 21, five wide, of a wicket conveyor. Shafts 24 and 26 will have mounted thereto sprocket wheels 40 and 42 respectively which mount roller chains 44. It will be appreciated from FIG. 1 that the roller chains are longitudinally oriented with respect to wicket travel and that they occupy the space between adjacent wickets. Also, though FIG. 1 shows just two such chain and sprocket arrangements, other chains and sprockets may be added in each space between wickets, depending on requirements. It will be noted that the bottom chain path runs under the table top 19.

The length of the chain in the embodiment illustrated is equal to four times the circumference of the driving sprocket 40 so that four complete revolutions of the sprocket 40 will cause a complete and even circuit of the chain 44.

Each chain has mounted thereto four sheet clamps 46 spaced equally over the length of the chain and transversely aligned as between the chains in racks of two. The sheet clamps consist of a rectangular plate 48 of substantial length secured as by recessed screws or bolts 50 to a special link 52 in the roller chain affording a transverse support 54 or ears on the outside surface of the chain for such attachment. The plate 48 extends longitudinally of the chain, is wider than the chain and lies on the outside of the chain. The plates 48 have at their leading end a pair of spaced, forwardly extending, upstanding ears 56 having backwardly inclined trailing edges 58 which make an acute angle with the top surface of the plate 48. The clamps also include a shoe member 60 secured to a shaft 62 extending transversely between the ears 56 and mounted for rotation in appropriate bores therein. The shoe is a generally rectangular member having a toe 64 extending to the rear thereof which has a bottom surface 66 arranged to lie flat against the top surface of plate 48. The shoe includes a stud 68 extending from its leading end. A spring 70, under tension, extends from stud 68 to a rod 72 extending between ears 56 to urge the shoe into clamping relation against plate 48 as illustrated in FIG. 6. The shoe is free to rotate against the force of spring 70 to a position where the clamping surface 66 is flush with or recessed behind the inclined surface 58 of the ears 56.

The shaft 62 in each of the paper clamps extends beyond the ears 56 at one end 74 thereof and mounts an L-shaped cam follower 76. The cam follower includes an enlarged end 78 through which connection to the shaft 62 is made and, when disengaged from the cam to be later described, a portion 80 extending forwardly and toward the chain and an end 82 at generally right angles to the portion 80 which is rearwardly inclined and laps over the side of the chain 44. This described position of the cam follower 76 is a consequence of the spring 70 urging the shoe toward closure and the cam follower 76, on the same shaft 62, to the described cam-intercepting position.

The cams 84 which cooperate with the cam followers are blocks having a camming surface 86 which extends, in the counterclockwise direction of the travel of the chain, from a point 85 on or inside of the inside periphery of the chain to a point 87 flush with or beyond the outside periphery of the chain. The cams are mounted on one end of arms 88 which have bearing structure 90 on the underside thereof. The bearing structure is mounted to rotate freely on the shaft 24. The sprocket wheel 40 and a collar 91 contain the bearing structure 90 to hold the cam in the plane of movement of the cam follower 76.

A rocker shaft 94 is mounted parallel to and closely behind the front sprocket shaft 24 by pillow blocks 96 to the side table members 14. The shaft mounts forwardly extending horizontal arms 98 in alignment with the rear end of the cam arms 88. Vertical links 100 connect the forward end of the rocker shaft arms to the rearward ends of the cam arms.

A solenoid 102 having a forwardly extending armature 104 is mounted to the table top 19 behind shaft 94. The armature is connected to a forwardly extending rod 106 by a link 108. The rod is contained in a bearing sleeve 110 mounted on table top 19 to guide the rod for movement forward and back. The rod 106 terminates at its forward end in a downwardly extending finger 112. Shaft 94 has a downwardly extending rocking arm 114 secured thereto which is connected at its bottom end to the bottom end of finger 112 by a link 116.

Reference was made above to the bearing structure 90 on the underside of the cam arm 88. The structure includes a bearing sleeve 118 encompassing shaft 24 which is contained in a generally rectangular block 120. A cam support 122 is secured to the underside of the table top 19 and extends forwardly to underlie the bearing structure 90. The support 122 has a tapped hole in its end into which a cap screw 124 is inserted. The cap screw also has a lock nut 126 thereon. A spring mounting finger 128 is held under the lock nut 126 and extends forwardly from the support. A stud 130 is secured to the front edge of the bearing block 120 and a cam return coil spring 132 under tension extends between stud 130 and finger 128.

For reasons which will be set forth later, the cam 84 is to occupy a predetermined position for the greater part of one cycle of the stripper-stacker, but momentarily is to be displaced from that position. The initial position of the cam will be adjusted by the cap screw 124. The cap screw checks the rotation of the bearing block and hence the cam in a counterclockwise direction (FIG. 5) under the influence of spring 132. The lock nut 126, of course, secures the set screw in its desired position. When the solenoid 102 is energized, the armature 104 thereof is retracted to the right, rotating rocker shaft 94 in a counterclockwise direction through the linkage of the armature by link 108, shaft 106, finger 112 and link 116 to the downwardly directed rocking arm 114. Rotation of the rocker shaft 94 carries the forward ends of the rocker shaft arms 98 downward to rock the cam arms clockwise and move the cams upward from the illustrated full line position to the dotted line position.

Referring particularly to FIGS. 3 and 4, I employ nudgers 136 to effect the transfer of sheets from the wickets to the stripping mechanism. Nudger support arms 138 are secured to the underside of the table top 19 to extend forwardly therefrom under and beyond the front sprocket shaft 24 in the path of movement of the wicket hook ends 140. A spacer 142 lies on top of the nudger support arms and the nudger frame 144 lies on top of the spacer. The nudger support arms 138 have a channel section, open side up, with inturned lips 146 on the top side. Bolts 148 extend through the base 150 of the nudger frame and are threaded into the blocks 152 contained under the lips 146 of the support arms to provide for anchoring the nudgers at any point on the length of the arms.

The nudger frame 144 is a U-shaped member, base-150-side down, having a bearing sleeve 154 extending between the sides 156 thereof. The bearing sleeve contains a shaft 158 which extends substantially beyond the sleeve 154 at each end thereof outside the sides 156 of the frame. The ends of shaft 158 have collars 160 mounted thereto which carry upstanding nudger fingers 162. The shaft 158 has a downwardly extending post 164 attached to the center thereof and extending through an arcuate notch 166 in the sleeve 154. A nudger return coil spring 168 is hooked at one end to post 164 and at the other end to a rod 170 spanning the sides 156 of the nudger frame rearwardly of the shaft 158.

The nudger fingers 162 lie in the path of travel of the hook ends 140 of the wickets 21 and have the upper ends 172 thereof displaced forwardly to extend beyond the hook ends when the hook ends intercept the fingers to displace positively sheets from the hook ends of the wickets. It will be appreciated from FIG. 4 that as the wickets travel to the right, the nudgers, in their upright position, will push off any sheets resting on the hook ends and as the wickets then move further, the nudger fingers will be pushed over clockwise toward a horizontal position against the urging of spring 168 to permit the passage of the wicket. When the wicket is clear, the nudgers will return to their upright position. The bottom end of the slot 166 determines the upright position of the fingers.

A vertical plate 174 is secured to the table top extention 36 by feet 176. The plate extends substantially above and to the front of the front sprocket shaft 24. To this plate a solenoid switch 178 and a clutch switch 180 are mounted having switch fingers 182 and 184, respectively, extending into the path of movement of the wicket 21 nearest the clutch 30. The switches are mounted as by bolts 186 extending through longitudinal slots 188 in the plate 174 to provide for fore and aft adjustment of the position of the switches. The solenoid switch, upon actuation, energizes the cam lifting solenoid 102, and the clutch switch, upon actuation, energizes the one revolution clutch 30.

I also provide one or more anti-jam switches 190, only one being illustrated here (FIGS. 1 and 3). The anti-jam switch may be carried by an arm 192 which may be secured at its other end to the side of the nudger spacer 142 as illustrated or any other appropriate stationary portion of the apparatus. The arm will be so bent or otherwise formed as to position the actuating element 194 of the switch between two wickets in their travel through the stripper and behind the line of the nudgers. The nudgers, of course, should remove the sheets from the wickets. Should there be any total or partial failure to do so and a sheet remain in the wickets or be carried past the nudgers, the sheet will engage the actuating element 194 of the switch.

My device also includes sheet discharging mechanism 196 illustrated in FIG. 2. This mechanism is situated on the bottom side of the chain travel and adjacent the rear or driven sprockets 42. It will be noted that the bottom side of the chain travel is below the level of the table top 19. A bar 198 is bolted against the top of the side walls 14 of the frame immediately ahead of the rear sprockets 42 as by bolts 200. The bar has welded or otherwise secured thereto blocks 202 substantially identical with the cams 84 with an identical camming surface in registry with the cam followers 76 of the sheet clamps. One or more flat tongues 204 will be secured to the rear edge of the bar 198 to extend downwardly therefrom between adjacent chains. The tongue 204 constitutes a stop for discharged sheets of paper to insure their falling with sufficient accuracy into the stack 22 to permit the jogging thereof.

An electrical circuit may appropriately be incorporated in my apparatus as shown in FIG. 7. From a source of power 196 a circuit extends to the wicket conveyor motor M through the normally closed anti-jam switch 190. A second circuit likewise extends to the single revolution clutch 30 through the normally open clutch switch 180. A third circuit extends to the cam lift solenoid 102 through the normally open cam lift switch 178.

The operation of the illustrated and described embodiment of my invention is as follows. The frame 12, mounting the stripper-stacker, will be situated, as described, under the wicket conveyor with the forward end of the stripper at the point where the wickets begin their swing through the vertical position prior to being carried upward to receive new, wet, printed sheets. The sprocket wheels and chains thereon will be so adjusted that the end or beginning of an exact revolution of the front sprocket wheel 40 will place one of the paper clamps 46 on the periphery of that sprocket wheel and slightly above the center thereof. In such position the plate 48 will be inclined backward and the trailing edge 78 of the ears inclined forward to define a vertical notch into which the bottom edge of a dislodged sheet may settle. The plate 48 is long to provide a substantial area of acceptance for entering sheets.

In this position the cam follower 76 is engaged on the cam 84 as illustrated in the full lines of FIG. 5. The cam follower being swung away from its rest position, the shoe 60 has been swung back between the ears to open the notch between the plate 48 and the rear ear surfaces 58.

As may be best appreciated in FIG. 1, the nudgers 136 will be adjusted on their support arms 138 to encounter the wickets 21 and dislodge the sheets carried by them to drop the bottom edge of the sheets against the lower portion of plate 48 of the clamps.

It will be borne in mind that the wickets will be traveling continuously. As will be evident from FIG. 1, the cam lift solenoid switch is situated to be encountered by the side of the wicket nearest the motor before the clutch switch. The cam lift solenoid will be adjusted on its support 174 so that the switch element of the switch will be engaged and actuated by the wicket a short but appreciable time after the sheet has been discharged from that row of wickets by the nudgers. The sheet will be dislodged by the nudgers to drop into the open notches of the paper clamps 46. The row of wickets proceeds a short distance during which time the sheet is falling and settling into at least two of the transversely aligned clamps, whereby the sheet is stably supported on a consistent line. The wicket then engages the cam lift switch arm 182. The solenoid 102 is energized, and the cams 184, as described above, are raised to the dotted line position (FIG. 5) and out of engagement with the cam follower 76. The cam follower and associated shoe 60 thereupon assume the dotted line position of FIG. 5 under the influence of spring 70 with the toes 64 of the shoes clamping the bottom edge of the paper against plates 48. Shortly thereafter, the clutch switch is energized and shaft 24 makes one complete revolution. At the conclusion of that revolution another rank of empty paper clamps is in the position shown in FIG. 5 to receive a sheet from the next wicket and the just loaded rank of sheet clamps is stopped in the center of the underside of the sheet conveyor as illustrated in FIG. 2. When the second rank of sheet clamps is loaded and the clutch again energized, the first rank of clamps is carried to the position shown at the right end of FIG. 2 on the periphery of the sprocket wheels 42. In moving to that position, the cam followers 76 have encountered the discharge cams 202 to release the sheet and further backward travel of the sheet has been checked by the stop tongue 204. The sheet will then settle on the stack 22 with sufficient accuracy to permit jogging into exact alignment.

Considering particularly FIG. 2, it will be appreciated that the sheets will be received from the press, printed side up, on the back or top sides of the wickets 21. They will be carried through the drying and rehumidifying zone still resting against the back of the wickets with the printed side standing clear of any wicket contact. The wickets have a backward inclination during this passage to insure against contact. When the wickets begin their return journey through the tempering or stabilizing open air passage, the wickets swing through the vertical and over which will cause the sheets to fall across the wickets next ahead with the printed side against those wickets. The wickets are backwardly inclined during the return passage, as well, for sheet stability. Thus, when the sheets are nudged from the wickets for deposit into the sheet clamps, the printed side, in FIG. 2, will be to the right and facing somewhat downwardly. As the clamps then carry the sheets under the stripper and to the stack 22, the printed side will be uppermost and the quality of the printing operation may be checked by a glance.

It will be appreciated from the foregoing description, that I have devised a stripper mechanism which meets in highly satisfactory fashion its stated purposes. It stacks the sheets, printed side up.

In a wicket conveyor, a sheet will be carried on more than one wicket. It will be rare, because of the necessary length of the wickets, that the sheet will be pushed out of all of the wickets supporting it simultaneously. Therefore one corner of the sheet will fall before the other. Under the stripping procedures presently used, the sheet will be conveyed in a cocked position to the stack. There will be no consistency as between the separate ranks of wickets as to which corner of the sheet will drop first or to what degree one corner will lead the other. The random orientation of the successively dislodged sheets will be transferred to the stack and is too great to correct by jogging.

Likewise, the irregular fall or removal of the sheets is a source of jamming. A diagonally oriented sheet may easily interfere with the passage of the next following wicket. It may interfere with the fall of succeeding sheets. It may be picked up by the following wicket and be carried on through to disrupt the reception of fresh sheets, etc. By the use of my device, a dislodged sheet will fall into a stationary clamp and be held there for a period of time to permit the sheet to settle into all of the clamps of the rank to put the bottom edge of the sheet in a predictable horizontal plane. At the conclusion of this period, the sheet will be seized uniformly across its entire bottom edge and whisked from between the ranks of wickets to the stack 22. The alignment of the sheets in the stack therefore will be approximate and close enough to permit jogging. The sheet will be seized at spaced points over its bottom edge so as to be drawn firmly and uniformly from the conveyor, unlike previous practice where a corner only may be seized and torn off to defeat the extraction. Finally, the anti-jam provision will effectively stop the wicket conveyor should there be any failure of the stripper to operate as intended with respect to any particular sheet.

It will be further appreciated that I have described an embodiment only of my invention and that many alternatives both as to structure and arrangement of the components thereof will readily suggest themselves to those skilled in the art. I therefore desire that my invention be regarded as being limited only as set forth in the following claims.

I claim:

1. A stripper for a wicket conveyor having a plurality of wickets arranged in transverse rows wherein sheets are carried at an angle to the vertical, printed side down, which comprises means for displacing sheets successively from each rank of wickets so that said sheets fall freely, edge downwardly, from said wickets, transversely aligned and spaced means for receiving the bottom edge of said sheets spaced below said wickets, said means including elements for seizing the bottom edge of said sheets, means for moving said aligned receiving means together intermitently in vertically oriented endless paths in the line of wicket travel, means operative first to hold said receiving means stationary in a position to receive the bottom edge of a sheet from said displacing means and, an interval after the reception of a sheet, to close said seizing elements on said sheet sufficient to permit the bottom edge of a sheet to settle in said elements and thereafter to move said receiving means away from said conveyor in a path to invert said sheets, and means operative to open said seizing elements at a point when said sheets are in said inverted position.

2. A stripper for a wicket conveyor comprising a plurality of sheet clamps, means mounting said clamps in transverse, equally spaced, endless ranks, means for moving said mounting means intermitently a distance equal to the space between ranks, means for dislodging sheets consecutively from the wickets of said conveyor to delived said sheets by gravity into successive ranks of said clamps, means for energizing said moving means an interval after the delivery of each sheet sufficient to permit an edge of a sheet to settle into a rank of said clamps, and means elsewhere in the path of movement of said ranks for releasing said sheets upon passage of each of said ranks thereby.

3. A stripper for a wicket conveyor comprising a plurality of sheet clamps, means mounting said clamps in transverse, equally spaced, endless ranks, means for moving said mounting means intermitently a distance equal to the space between ranks to stop successive ranks at a predetermined point in relation to said conveyor, means for displacing sheets consecutively from said conveyor to fall into said clamps at said point, means for energizing said moving means an interval after the delivery of each sheet sufficient to permit an edge of said sheet to settle into a rank of said clamps, and means elsewhere in the path of movement of said ranks for releasing said sheets upon passage of each of said ranks thereby.

4. The combination as set forth in claim 3 including additionally means for opening said clamps at said point and means for closing said clamps a time interval after the displacement of each of said sheets sufficient to permit an edge of said sheet to settle in said clamps and before actuation of said energizing means.

5. The combination as set forth in claim 4 wherein said clamps include a movable member biased into engagement with a stationary member and having a cam follower, a cam situated to engage said cam follower at said point to remove said movable member from said engagement and separately operable means for disengaging said cam from said cam follower.

6. The combination as set forth in claim 3 including additionally means for opening said clamps at said point, and means successively responsive to the passage of a wicket of said conveyor, first, to close said clamps and, second, to energize said moving means.

7. The combination as set forth in claim 6 wherein said successively responsive means comprise sensing elements spaced longitudinally in the path of the wicket.

8. A stripper for a wicket conveyor having successive wickets for supporting successive sheets in attitudes slightly inclined from the vertical, comprising means for displacing sheets successively from successive wickets to permit said sheets to fall as the wickets arrive at a certain position, means providing surfaces spaced on opposite sides of the vertical center line of said sheets for receiving the bottom edge of said sheets, an element associated with said means for seizing the bottom edge of said sheets, means for moving said receiving means intermittently in a vertically oriented path, means operative first to hold said receiving means stationary in a position to receive the bottom edge of a sheet from said displacing means and, an interval after the reception of a sheet sufficient to permit said edge to settle in said receiving means, to cause said seizing element to seize said sheet and thereafter to move said receiving means generally downwardly and thence generally horizontally away from said conveyor, and means operative to release said sheets in a generally horizontal position at a point away from said conveyor.

References Cited in the file of this patent

UNITED STATES PATENTS

| | | |
|---|---|---|
| 1,252,856 | Story | Jan. 8, 1918 |
| 2,936,167 | Davidson | May 10, 1960 |
| 2,940,750 | Mestre | June 14, 1960 |
| 3,048,257 | Schuster | Aug. 7, 1962 |